United States Patent [19]

Smith

[11] Patent Number: 4,975,707

[45] Date of Patent: Dec. 4, 1990

[54] MULTIPLE SATELLITE LOCATING SYSTEM

[75] Inventor: Jordan R. Smith, Castle Rock, Colo.

[73] Assignee: Energetics Satellite Corporation, Englewood, Colo.

[21] Appl. No.: 380,177

[22] Filed: Jul. 13, 1989

[51] Int. Cl.$^5$ ............................................. H04B 7/185
[52] U.S. Cl. ..................................... 342/357; 342/354
[58] Field of Search ................................ 342/354, 357

[56] References Cited

U.S. PATENT DOCUMENTS

| | | |
|---|---|---|
| 3,303,499 | 2/1967 | Mahoney et al. |
| 3,699,577 | 10/1972 | Shadle ................................. 342/357 |
| 3,852,763 | 12/1974 | Kreutel, Jr. et al. ............ 342/352 X |
| 4,161,730 | 7/1979 | Anderson ......................... 342/352 X |
| 4,494,119 | 1/1985 | Wimbush . |
| 4,819,053 | 4/1989 | Halavais . |

Primary Examiner—Thomas H. Tarcza
Assistant Examiner—Mark Hellner
Attorney, Agent, or Firm—Leonard Tachner

[57] ABSTRACT

A locating system employs a multiple satellite configuration employing rotating scanning patterns for generating peak signal data which can be used to calculate the position of a signal source within a scanned region. One preferred embodiment utilizes two spaced satellites in high earth geosynchronous orbit and simultaneous narrow antenna beam rotation patterns to scan a substantial portion of the earth's surface. The invention is particularly advantageous for locating stolen vehicles and for tracking inventory. The system may also be used for determining altitude of a signal source that may, for example, be located on an aircraft in flight.

An alternative embodiment employs a peak-detecting ground-based receiver and satellite or other scanning devices which generate and transmit a signal to the receiver indicating the precise current position of the antenna of each satellite. The ground-based receiver is equipped with a computer for calculating its own position by repeatedly correlating the time of peak signal detection and the data from the received satellite signals. Such an alternative embodiment would enable precise self-position determination without the use of a command center.

18 Claims, 4 Drawing Sheets

MULTIPLE SATELLITE LOCATING SYSTEM

BACKGROUND OF THE INVENTION

1. Field of the Invention

The present invention relates generally to radiation-based two-dimensional and three-dimensional locating systems and more specifically, to a satellite-based locating system which in one preferred embodiment utilizes at least two spaced satellites in geosynchronous orbit scanning a preselected region on the earth's surface in intersecting simultaneous rotation patterns for precisely locating a point source of energy. Such device can be used to find lost or stolen items or to provide position information for navigation systems. It can also be used to provide location information to trucking and shipping companies, taxicab companies, airlines, bus and train companies, construction companies, surveyors and the like. It can also be used to determine the exact present position of any person or thing on which a suitable transmitter is located. Thus, the present invention can help in finding lost or kidnapped children. It can be used as means for instant communication of auto accidents or road emergencies as well as portable security devices for travelers, hikers, joggers and the like. A passive receiver-calculator version can be used to determine precise local position based upon peak detection of satellite down-link scanned transmissions. As used herein the "peak signal detection" includes other signal direction detection means.

2. Prior Art

The need for a reliable means for quickly and accurately locating the position of an object or person has long been recognized. In emergency situations such as shipwrecks, aircraft crashes or automobile accidents, the ability to quickly and accurately determine location is often a life and death matter. When a child is lost or has been kidnapped, fast and accurate location of his whereabouts is equally a life and death situation. Furthermore, for the elderly or infirm, the means of instantly communicating their exact present location in the event of a medical or other emergency returns to them the freedom to travel and independence. To the dispatcher of a taxicab company, instant knowledge of the exact location of each cab in the fleet allows him the time and cost savings of directing the nearest taxicab in his fleet to respond to a call from a customer. Of course, such time and cost savings can be realized in analogous service industries such as high speed delivery services and the like. A reliable and accurate locating system when used on aircraft offers aircraft collision avoidance as well as superior navigational information allowing straight line flight to any destination thereby saving both time and fuel. Upon approach to an airport, aircraft can utilize the added accuracy of such a navigational capability to provide instrument landing systems at any airport rather than the limited number of airports now offering such capability. The same advantages can be used on ships for allowing lower cost and great flexibility in scheduling due to the time savings of straight line navigation over long distances. In military applications, the exact position of troops and vehicles can prove vital to the battlefield commander. The ebb and flow of the battle can be instantly seen in real time presentations of troop and armament locations. For diplomats in hazardous areas, a precise and portable location system offers a means of security in the event terrorist activity results in taking hostages. The chance for successful rescue is greatly improved by knowing the exact present location of the hostage. Such locating devices may also be advantageously used in security systems such as car alarms.

Prior art attempts to provide fast, accurate location information suffer major limitations including high cost, complexity, inaccuracy, large size and weight and limited operating range. Relevant prior art includes the following U.S. Pat. Nos.:

3,063,048 Lehan et al
3,242,494 Gicca
3,440,635 Hull
3,702,477 Brown
3,703,714 Andrews
3,786,413 Matthews
3,789,409 Easton
3,795,896 Issacs
3,852,750 Klein
3,852,763 Kreutel Jr. et al
3,893,069 Mason
3,906,204 Rigdon et al
3,941,984 Chappell et al
4,012,728 Fowler
4,114,155 Raab
4,161,730 Anderson
4,177,466 Reagan
4,188,614 Habib Jr.
4,260,982 DeBenedictis et al
4,276,553 Schaefer
4,359,733 O'Neill
4,383,242 Sassover et al
4,445,118 Taylor et al
4,523,178 Fulhorst U.S. Pat. No. 3,063,048 to Lehan et al is directed to a discovery and location system which utilizes a single satellite for determining the position of a vehicle. The transmitter provides for a continuous wave signal to the satellite. However, the satellite is not stationary and as it approaches and recedes, the frequency of the signal received by the satellite changes due to the Doppler effect. When the satellite is closest to the object, the frequency of the received signal decreases at a maximum rate. Within the satellite, a phase-lock loop locks a variable frequency oscillator to the incoming signal. The output of the variable frequency oscillator is then beat against the output of a crystal oscillator to produce an audio beat signal whose frequency varies in a similar manner when taken with respect to the incoming signal.

U.S. Pat. No. 3,440,635 to Hull is directed to a police alarm-type system which provides for a transmitter to be carried on a person. In this reference the inventor uses a portable alarm transmitter carried by the person in order to signal a central location such as a police station by employing direction finders at two of the stations in a simultaneous manner. The capability of determining the origin of the alarm signal from the transmitter is provided and the person sending the signal may be located.

U.S. Pat. No. 3,703,714 to Andrews is directed to a remote alarm system that transmits an alarm signal to a displaced receiver when there is an unauthorized access made into a vehicle. This system includes a portable remote transceiver which transmits and receives signals. There is a vehicle mounted radio transceiver which is both operatively tuned to receive and to transmit to the remote transceiver. The remote transceiver further includes a means whereby a signal may be sent from the transceiver back to the vehicle transceiver to actuate some alarm system on the vehicle if so desired.

U.S. Pat. No. 3,852,750 to Klein is directed to a navigation satellite system. However it uses a plurality of synchronous satellite relays in order to determine the position of various earth bound vehicles. Three synchronous satellites are used alternatively to relay radio frequency carrier amplitude modulated signals with a multiplicity of low frequency tones. Each of the vehicles has a communication receiver including an amplitude modulated detector and a position location system. The amplitude modulated detected output of the communications receiver is coupled to the position location systems and determines the position of the vehicle from the relative phases of the low frequency tones.

U.S. Pat. No. 3,893,069 to Mason discloses a vehicle alarm system for alerting an owner of an unauthorized entry to his vehicle. The system includes a transmitter/receiver which may be in the form of a walkie-talkie unit. The owner of the vehicle may be in the range of the transmitter and is warned when anyone tampers with the vehicle through activation of a plurality of compartments which is what activates the transmitter when any of each of those switches is closed. Thus, this patent discloses the general concept of alerting a vehicle owner or user at a remote location that his vehicle is being tampered with.

U.S. Pat. No. 3,906,204 to Rigdon et al discloses a satellite positioning system to determine the position of any type of vehicle on the earth's surface by processing signals sent from the satellite. However, this is not a stationary satellite and the positioning is based on the Doppler shift in frequencies of the signals sent to the satellite in combination with the orbit description data encoded in the signals.

U.S. Pat. No. 4,177,466 to Reagan discloses an auto theft detection system where there is provided a transmitter adapted to broadcast a call signal through an antenna. An encoder is coupled to the transmitter and modulates the call signal to specify which one of many automobiles the call is directed to. The vehicle may then broadcast a locator signal when queried from a central station. Indicators are provided and are responsive to the location signal to determine the location of the possibly missing vehicle.

U.S. Pat. No. 4,276,553 to Schaefer is directed to a system for determining the position of the radiant energy source from a geostationary, synchronous satellite. The system and method are provided by scanning the beam of a narrow beamwidth antenna in first and second normal directions over a predetermined region which includes the source. The high level of energy transduced by the antenna in each of the scanning directions is detected and correlated with the scanning position of the beam by feeding the output of a detector to a recorder. Despite the fact that the satellite is stationary, it must utilize a plurality of earth stations to hone in on the target.

U.S. Pat. No. 4,445,118 to Taylor et al is directed to a navigation system which utilizes a geostationary satellite in combination with a global positioning system comprising a plurality of satellites. The position coordinates of various vehicles and other sources on the earth's surface is provided by processing a plurality of signals transmitted by the multiplicity of orbiting satellites in the global positioning system. An acquisition aiding signal generated by a control station is relayed to the various user terminals through the geostationary satellite.

The most relevant prior art known to the applicant is U.S. Pat. No. 4,819,053 issued Apr. 4, 1989 which discloses a locating system utilizing a single-point satellite or other such platform cooperating with a single ground station for accurately determining the precise location of a signal source. This patent to Halavais discloses a locating system utilizing a single platform such as a high earth geosynchronous satellite which scans through a combined yaw and roll pattern to generate location information for accurately determining the precise location of a source of radiant energy. Halavais also discloses the use of a single-point satellite-based transmitter having a precisely known antenna scanning pattern to provide local position assessment capability by means of a passive receiver-calculator.

SUMMARY OF THE INVENTION

The locating system of the present invention, in one particular embodiment thereof, includes a radio transmitter located on or attached to the object to be located. Such transmitter broadcasts over a selected frequency on command of either some detection device and/or an initiation signal from a command center on one or more frequencies. The system further comprises at least two spaced satellites in a geosynchronous high earth orbit to which a scanning rotation has been imparted. By such motion the scanning generates two intersecting narrow elongated footprints which describe a search pattern of the entire visible face of the earth. The satellites each comprise a narrow beamwidth antenna (i.e. $\frac{1}{4}$ degree in one direction) receiving the signal from the earth station radio transmitter only at those points of footprint intersection which pass through the target and a radio receiver tuned to receive the frequency or frequencies transmitted by the radio transmitter located on or attached to the object to be located.

Each satellite further comprises a radio transmitter wherein the signal received from the earth station transmitter is relayed to a command center where by triangulation, the exact location of the object to be located is determined. In other embodiments the satellites of the present invention comprise a narrow bandwidth monitor or detecting device such as an infrared detector or the like wherein detection occurs only at those points on the scanned surface wherein lines of triangulation pass through the target. Each such satellite further comprises a radio transmitter relaying a signal to a command center where through triangulation the exact location of the object or occurrence is determined. Although in a particular preferred embodiment herein disclosed, the scanning platform for relaying the signal source transmission to the command center is located on satellites in geosynchronous high earth orbit, the elements of the present invention may be readily utilized on platforms located in alternative locations such as low earth orbit, airplanes, helicopters, hilltops and the like. Furthermore, although the preferred embodiment utilizes a satellite where scanning is accomplished by means of satellite antenna rotation, it will be readily apparent to those having skill in the art to which the present invention pertains that such scanning may be achieved entirely by electronic means such as by means of a phased array antenna which is connected to an otherwise stationary platform.

The earth station transmitter portion of the present invention may be provided in the form of a relatively simple portable transmitter capable of transmitting upon command at a selected frequency and relatively low power, a preselected coded signal which conveys to the satellites or other platforms, information identifying the source of the transmission. Furthermore, the satellites or other platform portion of the present invention may be also of relatively simple implementation because the platform's function is simple. More specifically, the function of the platform is merely to relay the received signal transmission either directly or indirectly to a single-point ground station or alternatively, simply generate a radio frequency transmission in response to the detection of various forms of radiant energy. The ground station of the present invention comprises a suitable antenna capable of receiving the satellite-generated signals, a receiver for processing the signal and a computer for utilizing the data carried by each such signal.

Although the present invention may be utilized in a virtually unlimited number of applications, one particularly advantageous application of the present invention is its use in mobile security systems such as car alarms. It is well-known that a major limitation in car alarms is the lack of a guaranteed response to the triggering of the alarm. Typically, the response if any depends upon someone noticing the sound of a horn or the flashing of headlights and then taking the time to phone the police with a report. The present invention provides both a signal through the satellites and the exact location of the vehicle so that a receiving command center can provide positive guarantee of notification of the intrusion as well as the exact location to proper authorities. In such an application the transmitter portion of the present invention may be located in the vehicle and provided with a digital keyboard and other secure means for assuring that only the authorized operator of the vehicle has gained entrance and access to the vehicle. Otherwise the system may be automatically initiated for generating a suitable location and identifying transmission to the platform such as the satellites of the present invention, such transmission ultimately being received by the ground station which can pinpoint the present location of the vehicle and notify authorities not only that the vehicle has been stolen but also where they may find the vehicle and recover same for the owner.

A second embodiment utilizes the same scanning pattern but passive receiver-calculators instead of uplink transmitters to permit individual local position determination without the aid of a ground-based command center. Each such receiver-calculator is designed to correlate peak-signal detection with footprint rotation data from the satellites' transmitted signal and to calculate local position based upon one or more footprint intersections. The method of position calculation for this second calculation is essentially identical to that employed in the command center of the first embodiment. As used herein, the term "peak signal detection" includes peak signal strength detection as well as averaging of first and last signal acquisition, counting and averaging all signal acquisition and any other means for identifying the direction of maximum signal strength.

The present invention may be readily used for locating point targets in three-dimensions. As a result, the precise location and altitude may be determined using multiple satellites or other platforms. Such capability should prove extremely advantageous for aircraft navigation and tracking. A precision three-dimensional locating capability may also find advantageous application in the automated tracking and control of aircraft for both civilian and military purposes.

OBJECTS OF THE INVENTION

It is therefore a primary object of the present invention to provide a locating system of exceptional accuracy.

It is a further object of the present invention to provide a locating system which is relatively simple and inexpensive and which utilizes a radiant energy transmitter of sufficiently small size to be portable to the user.

It is still a further object of the present invention to provide a locating system which has worldwide range.

It is still a further object of the present invention to provide a locating system which operates in essentially real time.

It is still a further object of the present invention to provide a locating system capable of carrying a message to offer the user a means for communicating an emergency status either actively or passively to a command center where appropriate help can be dispatched or so that other messages to and between users may be sent and received.

It is still a further object of the present invention to provide an alarm system for mobile applications where an unauthorized intrusion of a vehicle or other object initiates guaranteed response to the exact location by the proper authorities.

It is still a further object of the present invention to provide a means for remotely monitoring various types of mechanical devices or chemical processes or the like and which assures proper intervention upon receipt of a signal identifying an anomalous condition.

It is still a further object of the present invention to provide a means for generating an intrusion alarm at locations remote from telephone communications or where factors make the use of a satellite-based system more desirable to the user.

It is still a further object of the present invention to provide a local position calculating capability in a ground-based receiver utilizing satellite "footprint" data on signals received from at least two scanning satellite-based transmitters.

It is still a further object of the present invention to provide a three-dimensional locating system utilizing at least two satellites and which may be used for determining the precise position and altitude of aircraft.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF PREFERRED EMBODIMENTS

Figure 1:
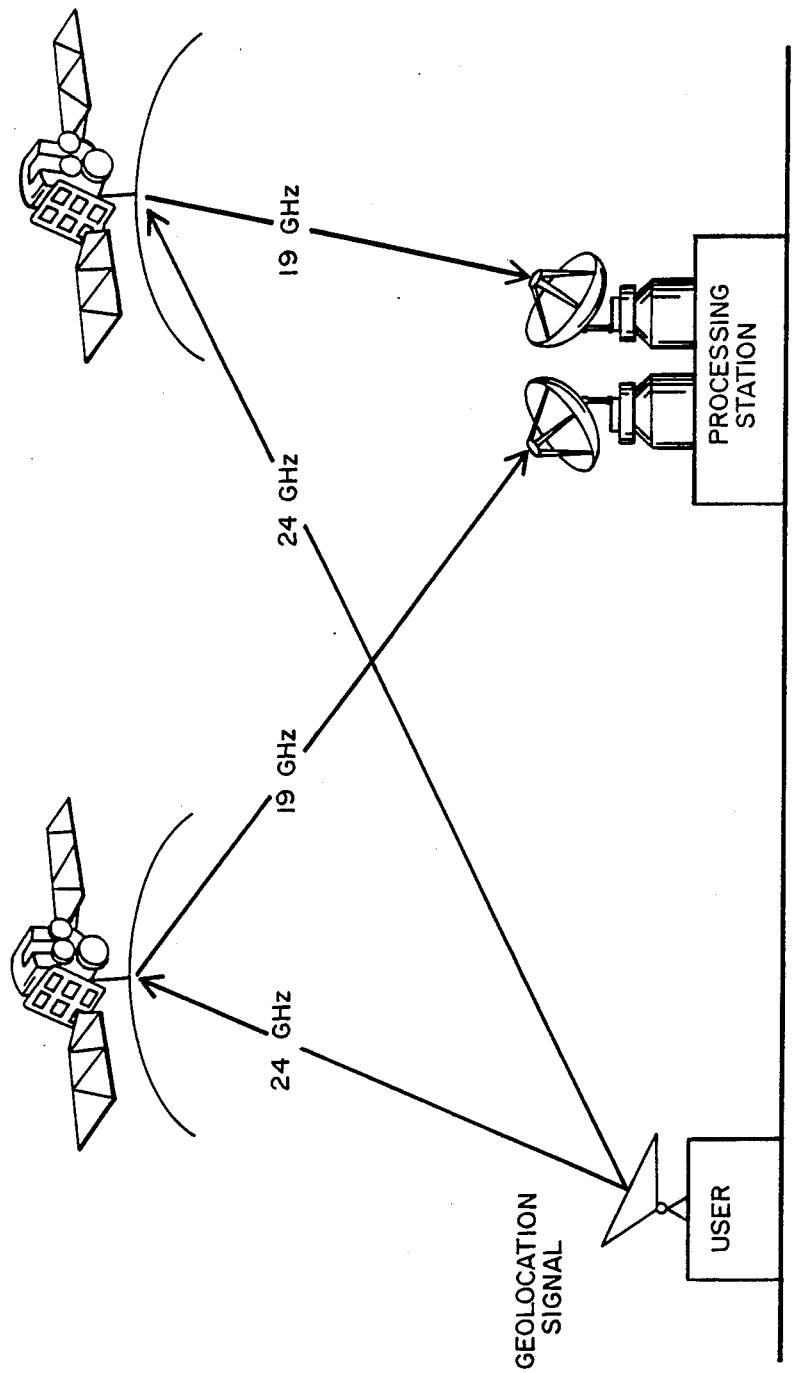
FIG. 1 is a schematic illustration of the concept of the present invention utilizing two spaced scanning satellites.

As shown in FIG. 1, the present invention comprises at least two satellites in a satellite location system capable of determining the position of users on Earth. The system components consist of : (1) users equipped with a transmitter (and optionally a receiver); (2) two satellites each equipped with a specially shaped antenna, and radio transponder; and (3) a central processing facility equipped with radio/antenna equipment to communicate with the satellites, and equipped with processors to compute user position. In the illustrated embodiment the user transmitter frequency is 24 GHz and the satellite down-link transponder frequency is 19 GHZ.

Figure 2:
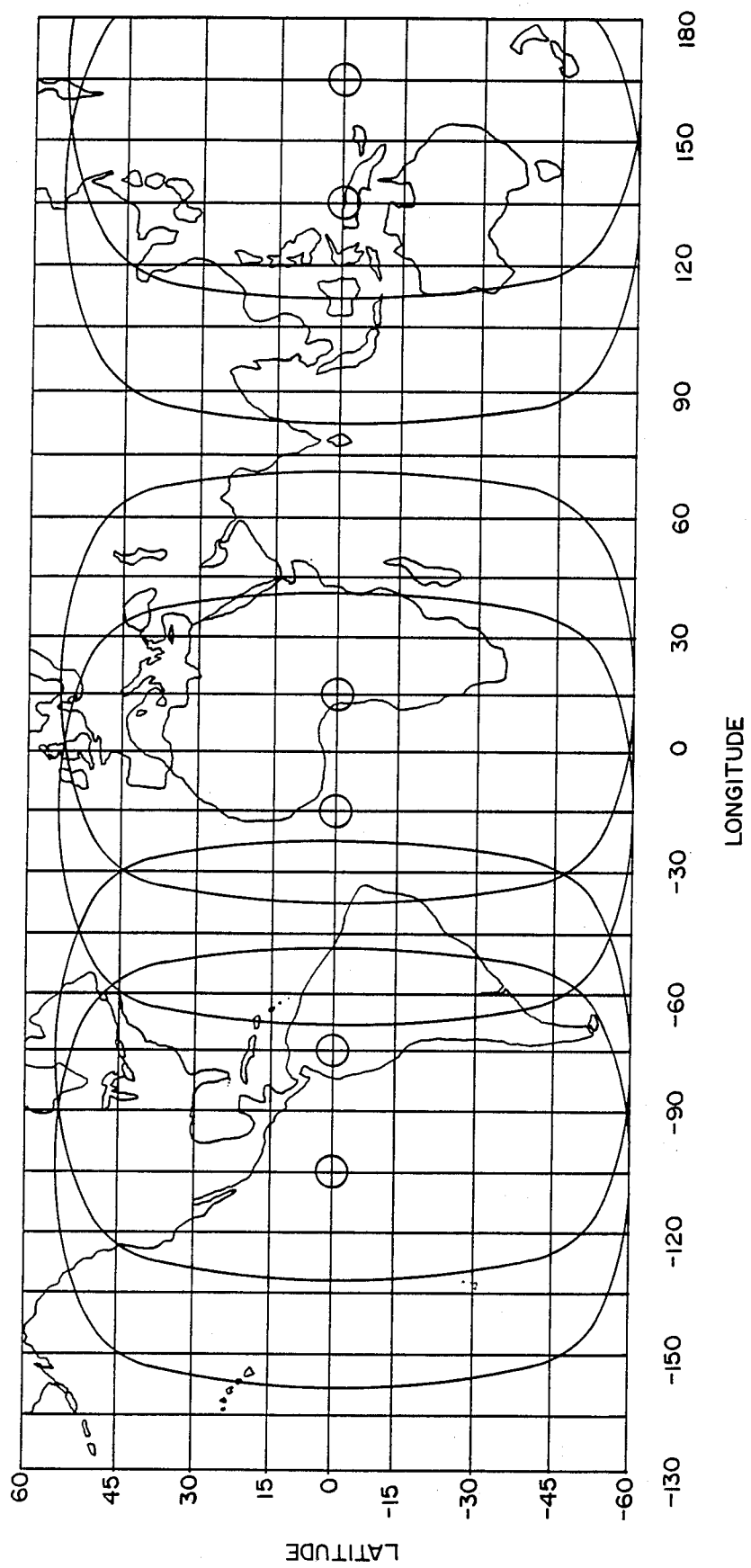
FIG. 2 is an illustration of the dual satellite coverage capability utilizing the present invention.

The space segment of the system consists of two satellites per major Earth region (such as the western hemisphere encompassing North and South America). As illustrated in FIG. 2, each region is served by two satellites stationed in geosynchronous orbit on the equator, and separated by a nominal ten degrees to forty-five degrees depending on location accuracy and Earth coverage required. Multiple satellite groupings of two satellites can provide relevant Earth coverage and one such grouping (or constellation) is shown in FIG. 2 using 30 degree satellite spacing for each region.

Figure 3:
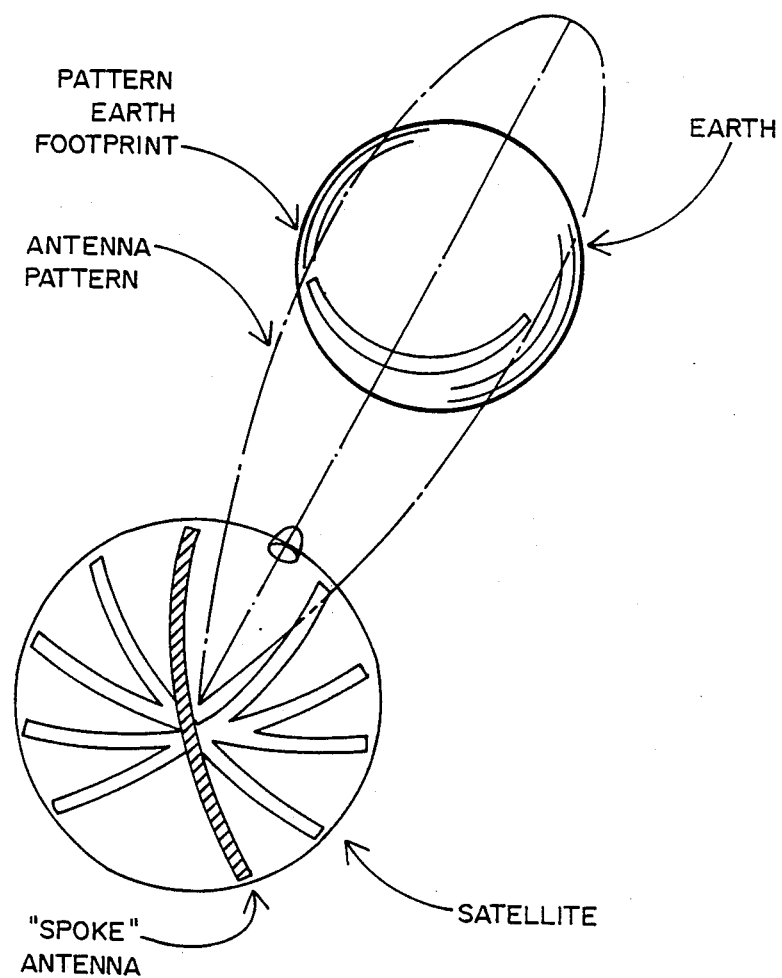
FIG. 3 is a conceptual illustration of the satellite antenna/earth "footprint" relationship for each satellite of the present invention.

As shown schematically in FIG. 3, each satellite is equipped with an antenna system illuminating the Earth's surface with a long but narrow pattern (referred to herein as the "footprint") capable of receiving coded signals from a user transmitter on Earth. This long, narrow pattern is produced by a long, but narrow antenna on the satellite, and is referred to as a "spoke". The spoke is caused to rotate, producing a rotating footprint from each satellite.

The footprint on the Earth's surface is developed through the use of a segment of a parabolic reflector at the satellite. The narrow dimension of the footprint is created by the wide dimension of the parabola (165 feet) and in fact, if the entire parabolic reflector were provided, a very small area of the Earth would be illuminated (approximately a 7 mile circle in diameter). However, only a small strip of the parabola is provided, and the narrow dimension of the strip produces the length of the footprint on Earth.

The antenna is caused to spin, thereby causing the pattern illuminating the Earth to spin at the same rotational speed. The actual orientation of the antenna is sensed with respect to the Earth's disk, a star (or stars), and/or the satellite's inertial navigation system to obtain knowledge of the pattern's location on the Earth.

Additionally, reference stations placed at precisely known locations on Earth may be used as calibration points to further define the antenna's location. These reference stations may be located by the geolocation processing of the central processing station and any error between the determined solutions and the actual known locations are used to correct the antenna (footprint) orientation data.

In the course of one satellite revolution, the footprint passes over a large region of the Earth's surface, and the satellite receives a response from each properly equipped user located in the region. Because the beam position (orientation) and therefore the footprint position is known, one line of possible user positions is established by the satellite. Because the two satellites covering a region are physically separated, two footprints are formed and therefore two intersecting lines of possible user positions are established. Because the transmitter of a specific user must be intersected by both lines during each satellite antenna revolution, the intersection of footprint lines from each satellite corresponds to the position of the user.

Figure 4:
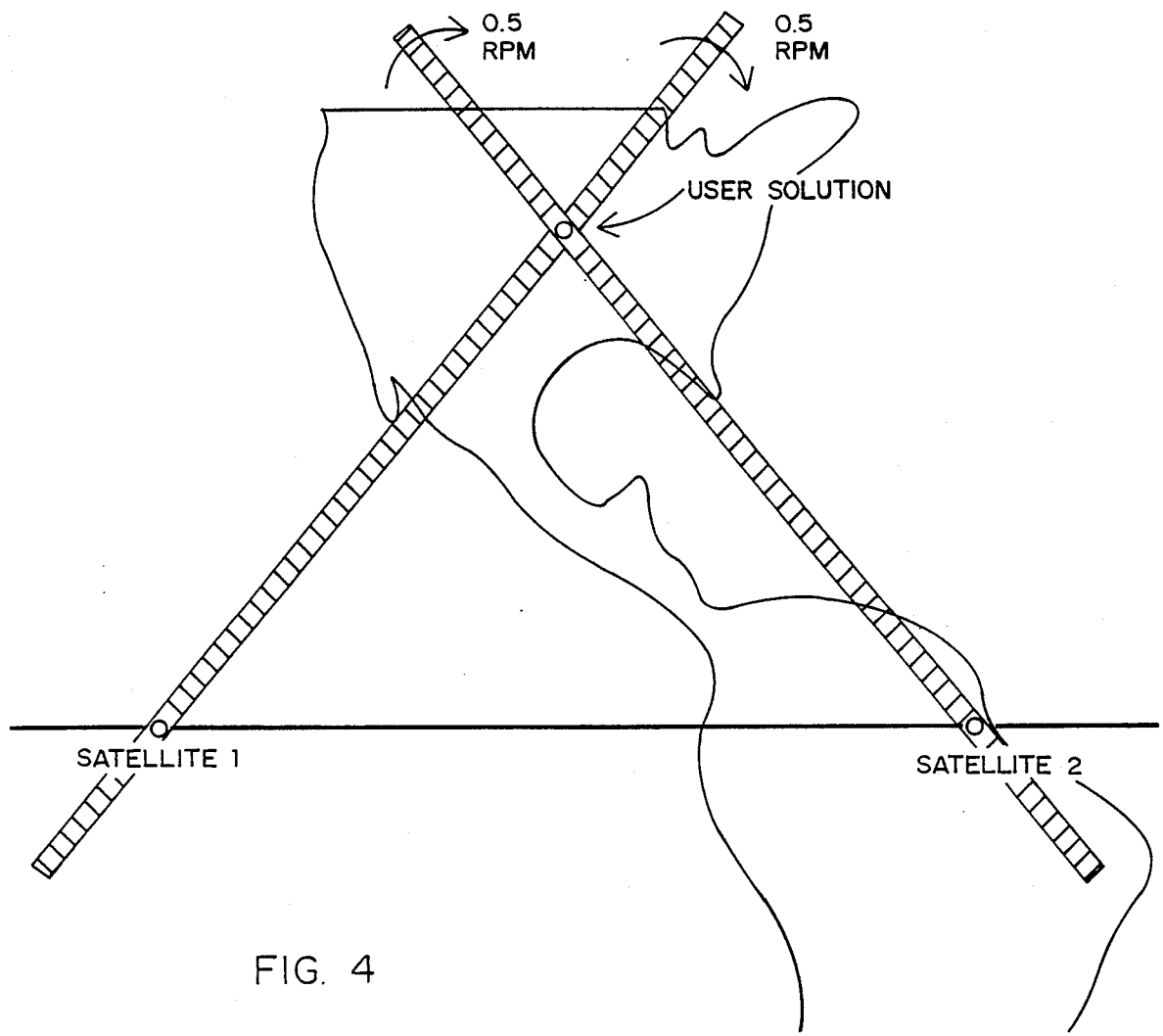
FIG. 4 illustrates the paths of the dual-satellite search pattern employed by the present invention in an embodiment of high earth geosynchronous orbiting satellites scanning the visible face of the earth for a signal from an earth-bound signal source.

It will be understood that for a constant and identical rate of rotation of each satellite's antenna, the locus of real time intersection points of the footprints will be a single line. However, except for very rapidly moving users, the processing station will be capable of accurately calculating precise user-locations from footprint intersections occuring at slightly different times for each satellite. Thus, for example, referring to the conceptual illustration of FIG. 4, it will be seen that satellite 2 will receive the coded signal of a user located on the Gulf coast of Florida before that signal is received by satellite 1. The actual time difference will be approximately 7 seconds for satellite locations and rotation rates shown in FIG. 4. A vehicle traveling at sixty miles per hour would travel only about 616 feet in that period of time. For user's traveling at a relatively constant rate of speed, the processing center calculation of user location can be made to compensate for all or most of this time-difference variation over several scans by using well-known methods of extrapolation.

With a single spoke satellite antenna, the antenna pattern must make at least one-half and possibly a full revolution (depending on satellite and/or antenna yaw characteristics) to be able to obtain a response from all users in the satellite's region. The revolution time to illuminate all users determines the system response time. The response time can be made more rapid (at the same rotation rate) by utilizing multiple footprints (spokes) for each satellite. A reference spoke having a slightly wider or narrower beamwidth would permit differentiation between multiple spoke receptions.

Each user is equipped with a transmitter that radiates a signal to the satellites. The signal used consists of a unique time-bandwidth code signature for each user. As the satellite footprint sweeps over the user's position, his unique signal is received by the satellite, translated to a different frequency band, and retransmitted to the central processing facility for the position determination solution.

Users equipped with a receive capability (as well as the transmit capability) can be controlled by the central processing facility, and their transmit state can be initiated when needed. By utilizing a transmit-on-demand capability, less system bandwidth is required, and satellite power benefits can be achieved. The link from the central processing facility to the satellite and subsequently to the user can also be utilized as a message channel.

It will now be understood that what has been disclosed herein comprises a user location determination system which utilizes twin satellites per scanned region, each with a rotating, long and narrow antenna pattern illuminating the Earth. The beams each separately receive a response from a user transmitter permitting two intersecting lines (corresponding to this long footprint dimension) to be formed by a central processing facility to determine the user's position.

Those having ordinary skill in the relevant arts, will now, as a result of the disclosure made herein, perceive various modifications and additions which may be made to the invention. By way of example, the precise number, location and spacing of the satellites as well as the antenna beam characteristics and rates of rotation, may be readily altered while still achieving the principal objects and advantages of the invention. Accordingly, all such modifications and additions are deemed to be within the scope of the invention the scope of which is to be limited only by the claims appended hereto.

I claim:

1. A system for determining the location of a first transmitter on the Earth's surface; the system comprising:
   at least two satellites in spaced-apart geosynchronous orbits;
   each such satellite having an antenna which produces a rotating beam, said beam being substantially longer in a first cross-sectional plane than in a second orthogonal cross-sectional plane;
   each such satellite also having a receiver responsive to the signal of said first transmitter and a second transmitter for re-transmitting a signal representative of said received first transmitter signal;
   the rotating antenna beam of said satellites scanning overlapping patterns in a region of the Earth's surface in which said first transmitter is positioned;
   means for receiving said re-transmitted signals of said second transmitter and calculating the precise location of said first transmitter by determining the intersection point of the peak signal strength of the signal received by each of said satellite receivers.

2. The system recited in claim 1 further comprising means on each said satellite for determining the precise orientation of said antenna beam upon receiving said first transmitter signal.

3. The system recited in claim 1 further comprising at least one reference transmitter positioned at a precisely known location in said Earth surface region for calibrating said system.

4. The system recited in claim 1 further comprising means in said first transmitter for generating a coded signal which identifies said first transmitter.

5. The system recited in claim 1 wherein each said satellite antenna comprises a segment of a parabolic surface.

6. The system recited in claim 1 wherein said satellites are positioned substantially above the Earth's equator and wherein the spacing between said satellites is in the range of ten to forty-five degrees measured circumferentially about the Earth's surface.

7. The system recited in claim 1 wherein the dimension of each said antenna for producing said second cross-sectional plane of said beam is approximately 165 feet.

8. The system recited in claim 1 wherein the rate of rotation of each of said antenna beams is about 0.5 RPM.

9. The system recited in claim 1 wherein the frequency of said first transmitter signal is approximately 24 GHz.

10. The system recited in claim 1 wherein the frequency of said second transmitter signal is approximately 19 GHz.

11. A system for determining the precise location of a source of energy in a selected region of the Earth's surface; the system comprising:
    at least two geosynchronous satellite-based receivers responsive to said source of energy;
    means, also based on said satellites, for simultaneously scanning overlapping respective line patterns in said region; for and means calculating of said precise location by determining the point of intersection of said respective line patterns corresponding to peak energy detection by said respective receivers.

12. The system recited in claim 11 wherein said scanning line patterns are rotated at a pre-determined rate.

13. The system recited in claim 11 further comprising means on each said satellite for determining the precise orientation of each said line pattern upon reception by said receiver of said energy.

14. The system recited in claim 11 further comprising at least one reference transmitter positioned at a precisely known location in said Earth surface region for calibrating said system.

15. The system recited in claim 11 further comprising means in said source of energy for modulating said energy for uniquely identifying said source.

16. The system recited in claim 11 wherein said satellites are positioned substantially above the Earth's equator and wherein the spacing between said satellites is in the range of ten to forty-five degrees measured circumferentially about the Earth's surface.

17. The system recited in claim 11 wherein said energy is radio frequency electromagnetic energy.

18. The system recited in claim 12 wherein said rate is about 0.5 RPM.

* * * * *